May 2, 1933.                G. ZAPF                1,906,782
METHOD FOR REDUCING THE EXTENSION IN WIRE ROPES

Filed Oct. 13, 1930

Patented May 2, 1933

1,906,782

UNITED STATES PATENT OFFICE

GEORG ZAPF, OF COLOGNE, GERMANY, ASSIGNOR TO FELTEN & GUILLEAUME CARLS-WERK ACTIEN-GESELLSCHAFT, OF COLOGNE-MULHEIM, GERMANY

METHOD FOR REDUCING THE EXTENSION IN WIRE ROPES

Application filed October 13, 1930, Serial No. 488,464, and in Germany October 24, 1929.

According to U. S. A. patent application, Serial No. 444,820, wire ropes, for instance bridge ropes, are, for reducing the extension which takes place when the rope is loaded, before being placed in position firmly wrapped while in the stretched state with one or more bandages of steel wire or steel band.

A simplification and improvement of this method consists according to the present invention in fixing on the rope, while in the stretched state, also before placing it in the position in which it is to be used, conical clamps at short distances of for instance about 1 metre from one another and removing them again after the rope is in position.

Figure 1:
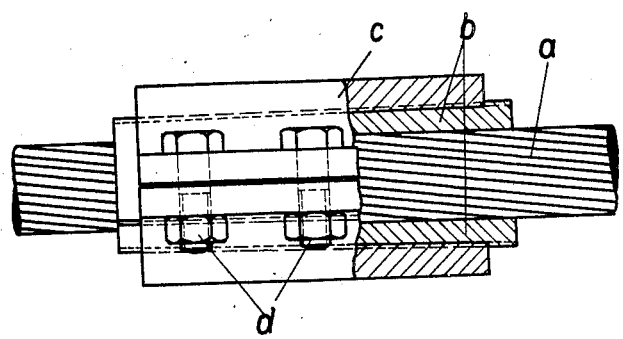
Figure 2:
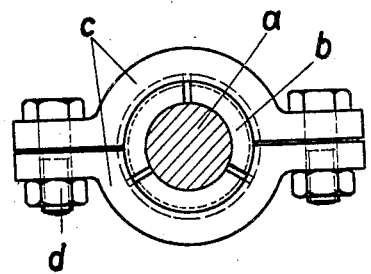

A constructional form of a clamp which is suitable for carrying out the method is shown by way of example in Figs. 1 and 2 of the accompanying drawing. Around the rope $a$ is placed an externally threaded conical sleeve $b$ which is made in three pieces for ensuring that it will bed uniformly on the rope surface and is embraced by a two-part nut $c$. The two-part nut is made like a shackle with two flanges which hold the nut together as a whole by means of bolts $d$. The forces required for bolting the nut together can act on these flanges.

Considerable portions of the surface of the stretched rope are embraced by a clamp, the three-part sleeve of which tapers conically towards the ends, so that one end of the sleeve is the reverse image of the other end. Each of the two ends of the sleeve is embraced by a two-part nut, such as that shown in Figs. 1 and 2.

Through this method the wire rope retains a considerable amount of the extension imparted to it when it was stretched, due to the stretching of the helical form of the wires and their being more firmly pressed against the core of the rope.

Figure 3:
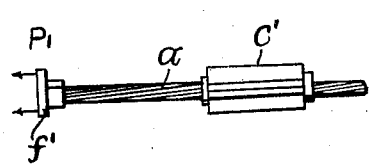
Figure 3:
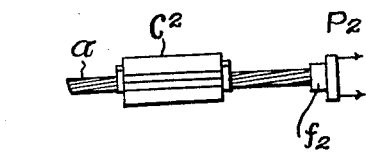

The method according to the invention is illustrated in Figure 3. The rope $a$ is stretched by applying tension forces $P_1$ and $P_2$ to the ends of the rope, the tension forces being applied by means of clamps $f_1$ and $f_2$ shown diagrammatically in the figure. While the rope is in the stretched state portions thereof are compressed by applying clamps $c_1$ and $c_2$ to the rope about 1 metre apart from one another. After the rope is in position the pressure is removed by removing the clamps $c_1$ and $c_2$.

What I claim is:

1. A method of reducing the extension of a wire rope, consisting in stretching the rope before placing it in the position in which it is to be used, compressing portions of the rope lying close together, while the rope is in the stretched state, and removing the pressure again after the rope is in position, as and for the purpose set forth.

2. A method of reducing the extension of a wire rope, consisting in stretching the rope before placing it in the position it is to occupy when in use, compressing it while in the stretched state by means of conical clamps disposed near one another and removing the said clamps after the rope is in position, as and for the purpose set forth.

3. A method of reducing the extension of a wire rope, consisting in stretching the rope before placing it in the position it is to occupy when in use, compressing it while in the stretched state by means of conical clamps disposed near one another and removing the said clamps after the rope is in position, as and for the purpose set forth.

In testimony whereof I have signed my name to this specification.

G. ZAPF.